United States Patent
Camp, Jr. et al.

(10) Patent No.: US 8,045,799 B2
(45) Date of Patent: Oct. 25, 2011

(54) SYSTEM AND METHOD FOR GENERATING A PHOTOGRAPH WITH VARIABLE IMAGE QUALITY

(75) Inventors: William O. Camp, Jr., Chapel Hill, NC (US); Mark G. Kokes, Raleigh, NC (US); Toby J. Bowen, Durham, NC (US); Walter M. Marcinkiewicz, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1013 days.

(21) Appl. No.: 11/940,362

(22) Filed: Nov. 15, 2007

(65) Prior Publication Data

US 2009/0129672 A1    May 21, 2009

(51) Int. Cl.
  *G06K 9/34*  (2006.01)
  *G06K 9/46*  (2006.01)
  *G06K 9/66*  (2006.01)
  *G06K 9/36*  (2006.01)
(52) U.S. Cl. .................. 382/173; 382/191; 382/232
(58) Field of Classification Search .................. None
  See application file for complete search history.

(56) References Cited

U.S. PATENT DOCUMENTS

| | | |
|---|---|---|
| 6,252,989 B1 | 6/2001 | Geisler et al. |
| 6,917,384 B1 | 7/2005 | Fukushima |
| 2003/0235341 A1* | 12/2003 | Gokturk et al. ............... 382/243 |
| 2004/0179110 A1 | 9/2004 | Hashimoto |
| 2005/0128312 A1 | 6/2005 | Fredlund et al. |
| 2006/0204034 A1* | 9/2006 | Steinberg et al. ............. 382/103 |
| 2008/0260267 A1* | 10/2008 | Goldberg et al. ............. 382/232 |

OTHER PUBLICATIONS

International Preliminary Report on Patentability from corresponding International Application No. PCT/US08/63678.
Rabbani, Majid, et al., "An overview of the JPEG 2000 still image compression standard", Signal Processing Image Communication, (2002), pp. 1-48.
International Search Report and Written Opinion from corresponding International Application No. PCT/US08/63678.

* cited by examiner

*Primary Examiner* — Samir A. Ahmed
*Assistant Examiner* — Li Liu
(74) *Attorney, Agent, or Firm* — Renner, Otto, Boisselle & Sklar, LLP

(57) ABSTRACT

Image data for a digital photograph is segmented into a first portion and a second portion. The image data of the second portion is processed to have a quality lower than the image data of the first portion. An image file for the scene is stored where the image file contains image data corresponding to the first and second portions so that the image file has a high quality portion and a low quality portion.

17 Claims, 3 Drawing Sheets

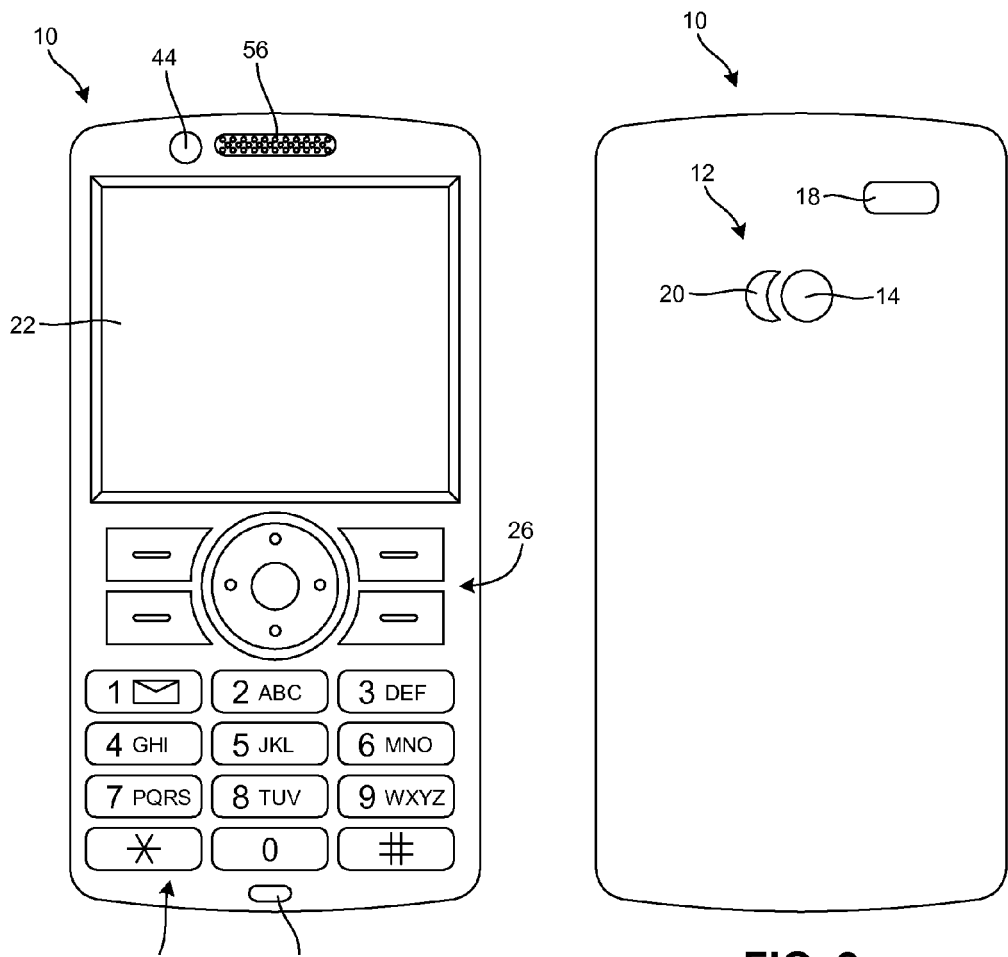

SYSTEM AND METHOD FOR GENERATING A PHOTOGRAPH WITH VARIABLE IMAGE QUALITY

TECHNICAL FIELD OF THE INVENTION

The technology of the present disclosure relates generally to photography and, more particularly, to a system and method to achieve different degrees of image quality in a digital photograph.

BACKGROUND

Mobile and/or wireless electronic devices are becoming increasingly popular. For example, mobile telephones, portable media players and portable gaming devices are now in wide-spread use. In addition, the features associated with certain types of electronic devices have become increasingly diverse. For example, many mobile telephones now include cameras that are capable of capturing still images and video images.

The imaging devices associated with many portable electronic devices are becoming easier to use and are capable of taking reasonably high quality photographs. As a result, users are taking more photographs, which has caused an increased demand for data storage capacity of a memory of the electronic device. Although raw image data captured by the imaging device is often compressed so that an associated image file does not take up an excessively large amount of memory, there is room for improvement in the manner in which image data is managed.

SUMMARY

To improve the manner in which image data for a photograph is handled, the present disclosure describes an improved image quality management technique and system. For example, the disclosure describes a number of techniques for identifying a portion of image data to receive less compression than other portions of the image data. The portion receiving less compression will have higher image quality and the portion receiving more compression will have lower image quality. The portion of the image data to receive less compression is selected using a technique that is intended to attempt to apply less compression to objects that are visually important to the user (e.g., faces) and more compression to objects of less importance (e.g., background scenery). In this manner, the size of an associated image file (e.g., in number of bytes) may be lower than if the image had been compressed uniformly across the image. But even though the average file size of the image files may be reduced to conserve memory space, the details of the image that are likely to be of importance to the user may be retained with relatively high image quality.

One exemplary technique for identifying the portion of the image data to receive less compression is using a fixed area, such as the center of the image or an area associated with a predetermined location. Another exemplary technique is to analyze the image data to find a visual element that is likely to be of importance to the user. Another exemplary technique is to accept user input that identifies a visual element for which the user would like to have higher image fidelity than the rest of the image. Another exemplary technique is to identify the object in a scene to which the user visually directs his or her attention and to compress that object with less compression than other portions of the image. These and additional techniques to varying the quality across the image will be described in greater detail in the sections that follow.

According to one aspect of the disclosure, a method of managing image data for a digital photograph includes capturing image data corresponding to a scene with a camera assembly, segmenting the image data into a first portion and a second portion, processing the image data of the second portion to have a quality lower than the image data of the first portion; and storing an image file for the scene, the image file containing image data corresponding to the first and second portions so that the image file has a high quality portion and a low quality portion.

According to one embodiment, the method further includes processing the image data corresponding to the first portion to reduce a quality of the image data corresponding to the first portion.

According to one embodiment of the method, processing the second portion of the image data is carried out by retaining a predetermined amount of the image data.

According to one embodiment of the method, processing the second portion of the image data is carried out by applying a compression algorithm.

According to one embodiment, the method further includes processing image data adjacent the first portion of the image data such that the adjacent image data has a quality between the quality of the second portion of the image data and the quality of the first portion of the image data.

According to one embodiment of the method, the adjacent image data is processed to have a graduated quality from the quality of the second portion of the image data to the quality of the first portion of the image data.

According to one embodiment of the method, the first portion corresponds to a predetermined area of the photograph.

According to one embodiment of the method, the first portion corresponds to a visual element in the scene that has a proximity relationship with a predetermined location within the photograph.

According to one embodiment of the method, the first portion corresponds to a visual element in the scene that is identified using pattern recognition.

According to one embodiment of the method, the pattern recognition is used to identify a face of a person.

According to one embodiment of the method, the first portion corresponds to a visual element in the scene that is identified by a user of the camera assembly.

According to one embodiment of the method, the first portion corresponds to a visual element in the scene that draws visual attention from the user of the camera assembly during capturing of the image data.

According to another aspect of the disclosure, camera assembly for taking a digital photograph includes a sensor that captures image data corresponding to a scene, a controller that segments the image data into a first portion and a second portion, and that processes the image data of the second portion to have a quality lower than the image data of the first portion; and a memory that stores an image file for the scene, the image file containing image data corresponding to the first and second portions so that the image file has a high quality portion and a low quality portion.

According to one embodiment of the camera assembly, the controller processes the image data corresponding to the first portion to reduce a quality of the image data corresponding to the first portion.

According to one embodiment of the camera assembly, the second portion of the image data is processed by retaining a predetermined amount of the image data.

According to one embodiment of the camera assembly, the second portion of the image data is processed by applying a compression algorithm.

According to one embodiment of the camera assembly, the controller processes image data adjacent the first portion of the image data such that the adjacent image data has a quality between the quality of the second portion of the image data and the quality of the first portion of the image data.

According to one embodiment of the camera assembly, the adjacent image data is processed to have a graduated quality from the quality of the second portion of the image data to the quality of the first portion of the image data.

According to one embodiment of the camera assembly, the first portion corresponds to a predetermined area of the photograph.

According to one embodiment of the camera assembly, the first portion corresponds to a visual element in the scene that has a proximity relationship with a predetermined location within the photograph.

According to one embodiment of the camera assembly, the first portion corresponds to a visual element in the scene that is identified using pattern recognition.

According to one embodiment of the camera assembly, the pattern recognition is used to identify a face of a person.

According to one embodiment of the camera assembly, the first portion corresponds to a visual element in the scene that is identified by a user of the camera assembly.

According to one embodiment, the camera assembly further includes a second camera assembly that images a user of the camera assembly during the capturing of the image data, and wherein the controller analyzes an output of the second camera assembly to identify a visual element in the scene that draws visual attention from the user of the camera assembly during capturing of the image data; and the first portion corresponds to the identified visual element in the scene.

According to one embodiment of the camera assembly, the camera assembly forms part of a mobile telephone that includes call circuitry to establish a call over a network.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

The terms "comprises" and "comprising," when used in this specification, are taken to specify the presence of stated features, integers, steps or components but do not preclude the presence or addition of one or more other features, integers, steps, components or groups thereof.

BRIEF DESCRIPTION OF THE DRAWINGS

FIGS. 1 and 2 are respectively a front view and a rear view of an exemplary electronic device that includes a representative camera assembly;

DETAILED DESCRIPTION OF EMBODIMENTS

Figure 3:
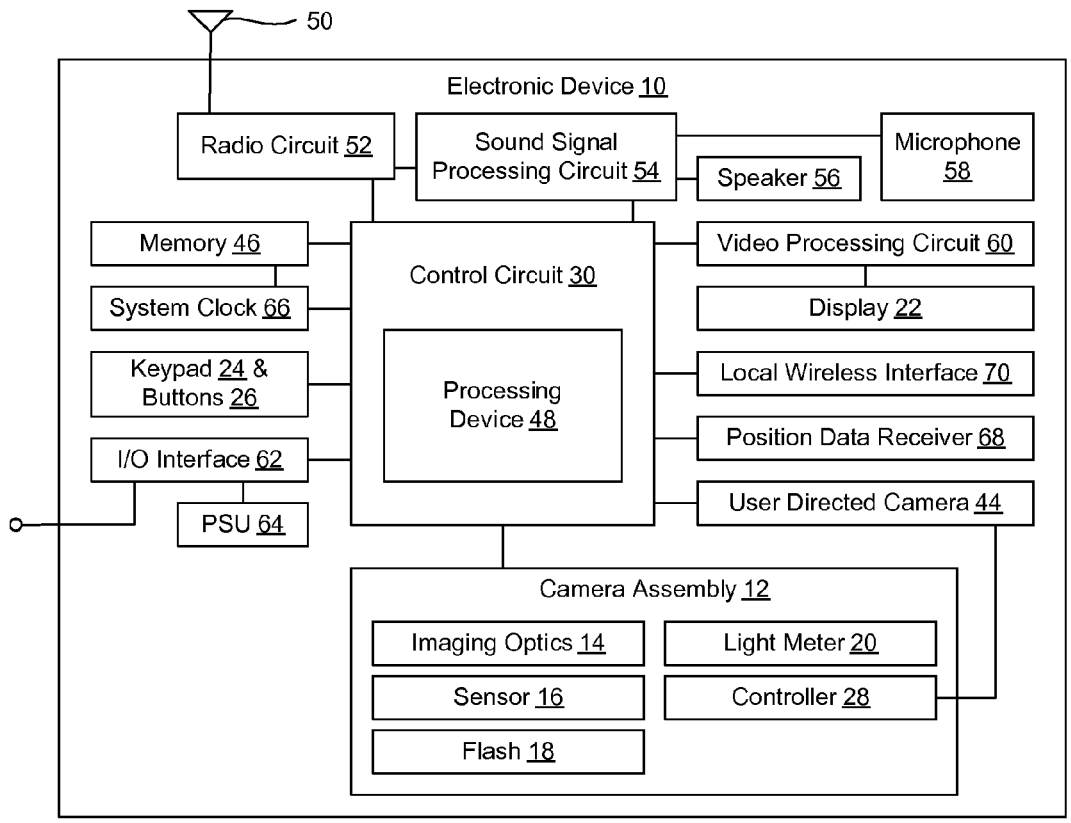
FIG. 3 is a schematic block diagram of the electronic device of FIGS. 1 and 2.

Embodiments will now be described with reference to the drawings, wherein like reference numerals are used to refer to like elements throughout. It will be understood that the figures are not necessarily to scale.

Described below in conjunction with the appended figures are various embodiments of an improved image quality management system and method. In the illustrated embodiments, the quality management is carried out by a device that includes a digital camera assembly used to capture image data in the form of still images, also referred to as photographs. It will be understood that the image data may be captured by one device and then transferred to another device that carries out the quality management. It also will be understood that the camera assembly may be capable of capturing video images in addition to still images.

The quality management will be primarily described in the context of managing image data generated by a digital camera that is made part of a mobile telephone. It will be appreciated that the quality management may be used in other operational contexts such as, but not limited to, a dedicated camera, another type of electronic device that has a camera (e.g., a personal digital assistant (PDA), a media player, a gaming device, a "web" camera, a computer, etc.), and so forth. Also, the quality management may be carried out by a device that processes existing image data, such as by a computer that accesses stored image data from a data storage medium or that receives image data over a communication link.

Referring initially to FIGS. 1 and 2, an electronic device 10 is shown. The illustrated electronic device 10 is a mobile telephone. The electronic device 10 includes a camera assembly 12 for taking digital still pictures and/or digital video clips. It is emphasized that the electronic device 10 need not be a mobile telephone, but could be a dedicated camera or some other device as indicated above With additional reference to FIG. 3, the camera assembly 12 may be arranged as a typical camera assembly that includes imaging optics 14 to focus light from a scene within the field of view of the camera assembly 12 onto a sensor 16. The sensor 16 converts the incident light into image data that may be processed using the techniques described in this disclosure. The imaging optics 14 may include a lens assembly and components that that supplement the lens assembly, such as a protective window, a filter, a prism, a mirror, focusing mechanics, focusing control electronics (e.g., a multi-zone autofocus assembly), and optical zooming mechanics. Other camera assembly 12 components may include a flash 18, a light meter 20, a display 22 for functioning as an electronic viewfinder and as part of an interactive user interface, a keypad 24 and/or buttons 26 for accepting user inputs, an optical viewfinder (not shown), and any other components commonly associated with cameras.

Another component of the camera assembly 12 may be an electronic controller 28 that controls operation of the camera assembly 12. The controller 28, or a separate circuit (e.g., a dedicated image data processor), may carry out the quality management. The electrical assembly that carries out the quality management may be embodied, for example, as a processor that executes logical instructions that are stored by an associated memory, as firmware, as an arrangement of dedicated circuit components or as a combination of these embodiments. Thus, the quality management technique may be physically embodied as executable code (e.g., software) that is stored on a machine readable medium or the quality management technique may be physically embodied as part of an electrical circuit. In another embodiment, the functions of the electronic controller 28 may be carried out by a control circuit 30 that is responsible for overall operation of the electronic device 10. In this case, the controller 28 may be omitted. In another embodiment, camera assembly 12 control functions may be distributed between the controller 28 and the control circuit 30.

In one approach, quality management for a photograph that is captured with the camera assembly 12 and where the photograph is represented by image data may be carried out to apply a variable amount of compression to the image data. For instance, the quality management may apply a low or moderate amount of compression to one region of the image and a higher amount of compression to the rest of the image. The portion of the image that is compressed by the lower amount will have higher image fidelity relative to the portion of the image that is compressed with a higher amount of compression. As such, a portion of the output image data corresponding to the portion of the image that is compressed with the lower amount of compression will be referred to as a high quality component and a portion of the output image data corresponding to the portion of the image that is compressed with the higher amount of compression will be referred to as a low quality component. The low quality component and the high quality component may be stored in a single image file as a photograph of the scene.

The portion of the image data that receives lower compression may be a contiguous section of the image data or may be non-contiguous. Therefore, the high quality component may correspond to one portion of the image data or more than one portion of the image data. For instance, the pixels of the image that fall within a designated area (or areas) for low compression may be compressed using a lower compression ratio than pixels that fall outside the designated area. For simplicity, the ensuing description will refer to an area (or portion) in the singular, but the reader should understand that the description of an area (or portion) in the singular explicitly includes one or more than one portions of the image.

The area receiving lower compression will have higher image quality relative to the remaining portion of the image that receives more compression. As a result, the image data is processed so that the corresponding image file has a high quality component and a low quality component. For instance, the processing of the image data may involve applying no compression to the pixels associated with the high quality area or the processing of the image data may involve applying some compression to the pixels associated with the high quality area. The processing of the image data may further involve applying compression to the pixels outside the high quality area with a compression ratio that is higher than the compression ratio that is applied to the pixels inside the high quality area.

Compression of the image data may include any appropriate compression technique, such as applying an algorithm that changes the effective amount of the image data in terms of number of bits per pixel. Compression algorithms include, for example, a predetermined compression technique for the file format that will be used to store the image data. One type of file specific compression is JPEG compression, which includes applying one of plural "levels" of compression ranging from a most lossy JPEG compression through intermediate JPEG compression levels to a highest-quality JPEG compression. For example, a lowest quality JPEG compression may have a quality value (or Q value) of one, a low quality JPEG compression may have a Q value of ten, a medium quality JPEG compression may have a Q value of twenty-five, an average quality JPEG compression may have a Q value of fifty, and a full quality JPEG compression may have a Q value of one hundred. In one embodiment, full or average JPEG compression may be applied to the image data corresponding to the area and low or medium JPEG compression may be applied to the image data outside the area.

In an embodiment of managing the image quality, the resolution (or number of pixels per unit area) may be controlled. One technique for controlling the resolution is to downsample (also referred to as sub-sample) the raw image data that is output by the sensor 16. As used herein, down-sampling refers to any technique to reduce the number of pixels per unit area of the image frame such that a lower amount of resolution is retained after processing than before processing.

As an example, the sensor 16 may have a native resolution of five megapixels. For the image data falling inside the high quality area, the quality management may retain the full resolution of the image data output by the sensor 16. Alternatively, the quality management may retain a high amount (e.g., percentage) of this image data, but an amount that is less than the full resolution of the image data output by the sensor 16. For example, the retained data may result in an effective resolution of about 60 percent to about 90 percent of the full resolution. As a more specific example using the exemplary five megapixel sensor, the retained image data may be an amount of data corresponding to a four megapixel sensor (or about 80 percent of the image data output by the exemplary five megapixel sensor). In one embodiment, a combined approach may be taken where all or some of the full resolution image data may be retained and a selected compression level may be applied to the image data.

For the image data falling outside the high quality area, the quality management may retain a relatively low amount (e.g., percentage) of the image data output by the sensor 16. For example, the retained data may result in an effective resolution of about 10 percent to about 50 percent of the full resolution. As a more specific example using the exemplary five megapixel sensor, the retained image data may be an amount of data corresponding to a one megapixel sensor (or about 20 percent of the image data output by the exemplary five megapixel sensor). In one embodiment, a combined approach may be taken where some of the full resolution image data may be retained and a selected compression level may be applied to the image data.

More than two quality levels may be used. For instance, the quality management technique may generate the high quality portion and the low quality portion as described above. In addition, one or more intermediate quality portions may be created by appropriate processing of the image data, such as retaining some of the raw image data (e.g., about 20 to about 75 percent of the image data) and/or applying a selected compression level to the image data. As a more specific example that follows from the forgoing example of a five megapixel sensor 16, the retained image data for the intermediate quality portion may be an amount of data corresponding to a two megapixel sensor (or about 40 percent of the image data output by the exemplary five megapixel sensor). In other example, a moderately lossy JPEG compression level may be selected for the intermediate quality portion. Similar to the high quality portion, the intermediate quality portion need not be contiguous.

In one embodiment where the intermediate quality area is generated, the intermediate quality area may be established by compressing pixels that are outside and adjacent the high quality area using a compression ratio that is between the compression ratio applied to the high quality area and the compression ratio applied to the remainder of the image. In another embodiment, the resolution of the image data that is outside the area and adjacent the area may be managed to have a resolution between the resolution of the high quality area and the resolution of the remainder of the image. In this manner, the high quality area is surrounded by the intermediate quality area, where the intermediate quality area has higher quality than the low quality area but less quality than the high quality area. In one embodiment, the intermediate resolution area may have graduated resolution. For instance, the resolution in the intermediate quality area may progressively taper from the high quality of the high quality area to the low quality of the low quality area so as to blend the high quality area into the low quality area. It will be appreciated that the intermediate quality area does not need to surround the high quality area. For example, in one embodiment, the intermediate quality area may have a fixed location, such as a center region of the image. It also will be appreciated that there may be plural intermediate portions where each has a different amount of quality.

The result of managing the resolution and/or compression differently for a designated area of the image and the remainder of the image is to establish a resultant image that has variable image quality regions, where one region has higher quality in terms of number of pixels per unit area and/or number of bits per pixel than the other region(s). It is contemplated that the associated image file may have a smaller file size than if the entire image were uniformly compressed and/or down-sampled using a single image data management technique to maintain a reasonably high level of quality for the entire image. Various embodiments for establishing the designated area will be discussed below. These embodiments represent ways of controlling the segmentation of the image into quality areas so that the higher quality area is likely to coincide with an object (or objects) in the imaged scene that is of the greatest interest to the user.

Figure 5:
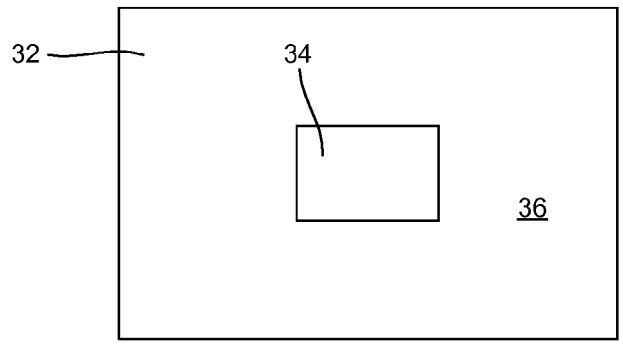
FIG. 5 is a schematic view of a representative image of a scene that has been separated into plural quality areas.

With additional reference to FIG. 5, an image 32 that is captured by the sensor 16 of the camera assembly 12 is shown. The image 32, which is comprised of image data, is a representation of a scene that is within the field of view of the camera assembly 12 at the moment in time when the image data was captured. The representative image 32 of FIG. 5 has been separated into plural quality areas to illustrate one exemplary technique for designating the high quality area.

In the technique of FIG. 5, the portion of the image 32 to have higher quality than the rest of the image is a predetermined area 34. The portion of the image 32 outside the predetermined area 32 may be considered a remainder area 36 that is processed to have lower quality than the predetermined area 34. In the illustrated embodiment, the predetermined area 34 is a rectangle located in the center of the image 32. It will be appreciated that the predetermined area may have another shape, such as a circle, an oval, a polygon that is selected to define a desired shape, or a polygon with rounded corners.

Figure 6:
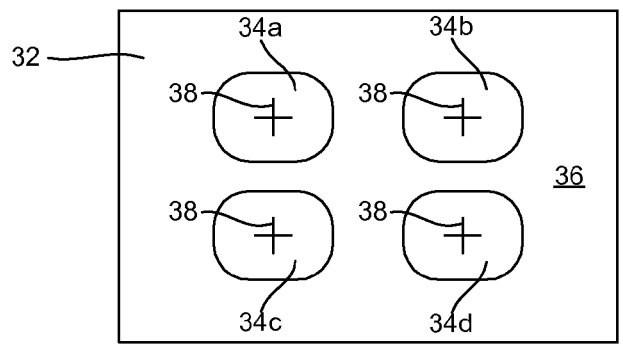
FIG. 6 is a schematic view of another representative image of a scene that has been separated into plural quality areas.

With additional reference to FIG. 6, the predetermined area 34 need not be located in the center of the image 32 and need not be contiguous. In the embodiment of FIG. 6, there are four spatially distinct regions 34a through 34d that are each designated to have higher quality than the remainder area 36 of the image 34. In the illustrated embodiment, the areas 34a through 34d are arranged following the rule of thirds. The rule of thirds states that an image can be divided into nine equal parts by two equally-spaced horizontal lines and two equally-spaced vertical lines. The four points formed by the intersections 38 of these lines can be used to align features in the image on the premise that an observer's eyes are naturally drawn toward these points.

In yet another embodiment, the predetermined region 34 may be specified by the user. For instance, the user may specify the size, shape and location of the predetermined region 34. In another embodiment, the user may select the predetermined region 34 from plural predetermined region choices. The choices may include, for example, a central region and the rule of third regions. In these embodiments where the user selects the predetermined region 34, the predetermined region 34 may be specified before the image data is captured or after the image data is capture. If selected before the image data is captured, the quality management processing may be automatically applied to captured image data. If selected after the image data is captured, the user may be presented with a preview of the image on the display 22 and the user may select the desired region by menu selection, by using a touch screen option or some other user input mechanism.

In another embodiment, the size, shape and/or location of the predetermined area 34 may be determined based on the type of scene. For example, a center region may be used for portraits and one or more rule of third regions may be used for landscape scenes. The determination of which area to use may be made by menu selection, may follow a camera mode setting, or may be determined by analyzing the image data. Once the location of the area 34 is determined, a visual cue may be displayed on the display 22 while the display 22 is acting as an electronic viewfinder. The visual cue may be an outline of the area 34. In another embodiment, the visual cue may be crosshairs or other feature that guides the user while the user composes a photograph so that the user's main interest overlaps with the area 34.

Figure 7:
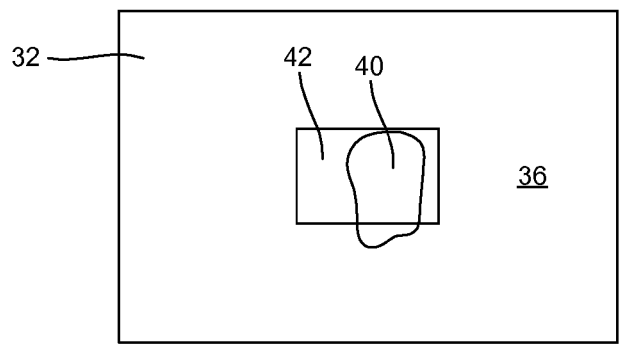
FIG. 7 is a schematic view of another representative image of a scene to which image analysis is applied to separate the scene into plural quality areas.

With additional reference to FIG. 7, the image 32 is shown in connection with another exemplary technique for quality management. In this embodiment, a visual element-based area 40 is designated for use as the high quality area. The area 40 corresponds to a visual element in the scene that has a relationship to a fixed region 42. In the illustrated embodiment, the fixed region 42 is a centrally located rectangle, but the fixed region 42 may have a different shape and may be located in another area of the image.

The technique may be implemented to identify a visual element that is present in the image 32 and that may be the user's main interest. In the illustrated embodiment, the image 32 is analyzed for a predominate visual element (or elements) that is located within or overlaps with the fixed region 42. The predominant visual element may be a face (or faces) and/or a body (or bodies). The predominant visual element also may be an object that is situated in front of a discernable background. If a predominant visual element is identified, a contour of the visual element may be used to define the visual element-based high quality area 40 and portions of the image 32 falling outside the high quality area 40 may serve as the remainder portion 36 that is processed to have lower quality than the area 40. In this manner, relatively low compression (or no compression) may be applied to a predominantly located visual element of the image 32 and more compression may be applied to the remainder portion 36 of the image 32. Alternatively, relatively little down-sampling (or no down-sampling) may be applied to a predominantly located visual element of the image 32 and more down-sampling may be applied to the remainder portion 36 of the image 32.

Figure 8:
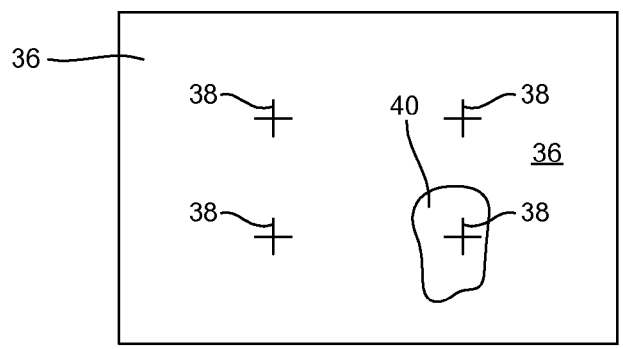
FIG. 8 is a schematic view of another representative image of a scene to which image analysis is applied to separate the scene into plural quality areas.

With additional reference to FIG. 8, the image 32 is shown in connection with another exemplary technique for quality management. Similar to the embodiment of FIG. 7, the visual element-based area 40 is designated for use as the high quality area. The area 40 in this embodiment corresponds to a visual element in the scene that has a relationship with one or more fixed locations. In the illustrated embodiment of FIG. 8, there are four fixed locations corresponding to the intersections 38 under the rule of thirds. The image 32 is analyzed for a predominate visual element (or elements) that overlaps with or is adjacent the fixed location. As indicated, the predominant visual element may be a face (or faces) and/or a body (or bodies), or may be an object that is situated in front of a discernable background. If a predominant visual element is identified, a contour of the visual element may be used to define the visual element-based high quality area 40 and portions of the image 32 falling outside the area 40 may serve as the remainder portion 36 that is processed to have lower quality than the area 40. In this manner, relatively low compression (or no compression) may be applied to a predominantly located visual element of the image 32 and more compression may be applied to the remainder portion 36 of the image 32. Alternatively, relatively little down-sampling (or no down-sampling) may be applied to a predominantly located visual element of the image 32 and more down-sampling may be applied to the remainder portion 36 of the image 32.

Another technique for segmenting the image 32 into the high quality area and the low quality area is by user identification of a visual element from the image 32. In one embodiment, the user may capture image data for the scene in the typical manner of taking a photograph. Then, the captured image may be displayed on the display 22. The display 22 may be touch-sensitive to form a touchscreen. During display of the image, the user may touch a point on the touchscreen that corresponds to an object (or objects) of the highest interest to the user. In turn, the camera assembly 12 may parse the image data for a visual element that is associated with the touched point and deem the part of the image 32 corresponding to the visual element as the high quality area. Processing in the manner described above then may be carried out. It will be appreciated that other user input techniques may be used to identify the object or objects of interest, such as using a navigation input device to move a pointer or crosshairs to a desired spot and then pressing a select key. User input to draw an outline around an object (or objects) also may be used to establish the high quality area.

Another technique for identifying the high quality area is by pattern recognition. In this embodiment, the image data may be analyzed for objects that are recognizable and likely to be the items of interest to the user. Recognizable items may include, for example, a person's face, a person's body (e.g., a humanoid form), a car, a truck, a cat, a dog and so forth. For instance, a common face recognition technique is to search an image for color patterns that are indicative of a pair of eyes together with a bridge of a nose. If such an object is recognized, a contour of the object may be used to define the high quality area. If plural objects are recognized, the contours of each of those objects may used to define one or more high quality areas. If a scene contains a relatively large number of recognized items (e.g., three or more items), the items may be prioritized based on size and/or location within the scene and a selected number of the highest priority items (e.g., three or fewer) may be used in the generation of the high quality area(s).

In another embodiment, the high quality area may be determined by analyzing the viewing behavior of the user while composing and/or taking the photograph. With continuing reference to FIGS. 1-3, the electronic device 10 may include a second camera 44 that is directed to capture the face of the user. Secondary cameras of this nature are included with some mobile telephones to facility video telephony. The camera 44 may be used to identify an object that the user is looking at when the user commands the taking of a photograph. For example, the camera 44 may be used to capture a video stream of the user. The video stream, and particularly the portion of the video stream corresponding to the user's eyes, may be analyzed to determine target of the user's gaze. The target of the user's viewing may be mapped to the image of the scene captured by the camera assembly 12. It is possible that the user may be looking directly at the scene or at the display 22 acting as an electronic viewfinder. In either case, the target of the user's attention may be extracted by comparing the target of the viewer's attention to the image data representative of the scene. If an object from the scene matches the target of the user's attention, then a portion of the image corresponding to the matching object may be used as the high quality area and the image data may be compressed as described above.

The technique used to identify the high quality area may be made a default operating characteristic of the camera assembly 12. In other embodiments, the technique used to identify the high quality area may be selected by the user from several possible techniques.

As indicated, the illustrated electronic device 10 shown in FIGS. 1 and 2 is a mobile telephone. Features of the electronic device 10, when implemented as a mobile telephone, will be described with additional reference to FIG. 3. The electronic device 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

As indicated, the electronic device 10 may include the display 22. The display 22 displays information to a user such as operating state, time, telephone numbers, contact information, various menus, etc., that enable the user to utilize the various features of the electronic device 10. The display 22 also may be used to visually display content received by the electronic device 10 and/or retrieved from a memory 46 of the electronic device 10. The display 22 may be used to present images, video and other graphics to the user, such as photographs, mobile television content and video associated with games.

The keypad 24 and/or buttons 26 may provide for a variety of user input operations. For example, the keypad 24 may include alphanumeric keys for allowing entry of alphanumeric information such as telephone numbers, phone lists, contact information, notes, text, etc. In addition, the keypad 24 and/or buttons 26 may include special function keys such as a "call send" key for initiating or answering a call, and a "call end" key for ending or "hanging up" a call. Special function keys also may include menu navigation and select keys to facilitate navigating through a menu displayed on the display 22. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, etc. Keys or key-like functionality also may be embodied as a touch screen associated with the display 22. Also, the display 22 and keypad 24 and/or buttons 26 may be used in conjunction with one another to implement soft key functionality. As such, the display 22, the keypad 24 and/or the buttons 26 may be used to control the camera assembly 12.

The electronic device 10 may include call circuitry that enables the electronic device 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The electronic device 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 46, executing applications to allow user interaction with the data, displaying video and/or image content associated with the data, outputting audio sounds associated with the data, and so forth.

The electronic device 10 may include the primary control circuit 30 that is configured to carry out overall control of the functions and operations of the electronic device 10. As indicated, the control circuit 30 may be responsible for controlling the camera assembly 12, including the quality management of photographs.

The control circuit 30 may include a processing device 48, such as a central processing unit (CPU), microcontroller or microprocessor. The processing device 48 may execute code that implements the various functions of the electronic device 10. The code may be stored in a memory (not shown) within the control circuit 30 and/or in a separate memory, such as the memory 46, in order to carry out operation of the electronic device 10. It will be apparent to a person having ordinary skill in the art of computer programming, and specifically in application programming for mobile telephones or other electronic devices, how to program a electronic device 10 to operate and carry out various logical functions.

Among other data storage responsibilities, the memory 46 may be used to store photographs and/or video clips that are captured by the camera assembly 12. Alternatively, the images may be stored in a separate memory. The memory 46 may be, for example, one or more of a buffer, a flash memory, a hard drive, a removable media, a volatile memory, a non-volatile memory, a random access memory (RAM), or other suitable device. In a typical arrangement, the memory 46 may include a non-volatile memory (e.g., a NAND or NOR architecture flash memory) for long term data storage and a volatile memory that functions as system memory for the control circuit 30. The volatile memory may be a RAM implemented with synchronous dynamic random access memory (SDRAM), for example. The memory 46 may exchange data with the control circuit 30 over a data bus. Accompanying control lines and an address bus between the memory 46 and the control circuit 30 also may be present.

Continuing to refer to FIGS. 1 through 3, the electronic device 10 includes an antenna 50 coupled to a radio circuit 52. The radio circuit 52 includes a radio frequency transmitter and receiver for transmitting and receiving signals via the antenna 50. The radio circuit 52 may be configured to operate in a mobile communications system and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards. It will be appreciated that the antenna 50 and the radio circuit 52 may represent one or more than one radio transceivers.

The electronic device 10 further includes a sound signal processing circuit 54 for processing audio signals transmitted by and received from the radio circuit 52. Coupled to the sound processing circuit 54 are a speaker 56 and a microphone 58 that enable a user to listen and speak via the electronic device 10 as is conventional. The radio circuit 52 and sound processing circuit 54 are each coupled to the control circuit 30 so as to carry out overall operation. Audio data may be passed from the control circuit 30 to the sound signal processing circuit 54 for playback to the user. The audio data may include, for example, audio data from an audio file stored by the memory 46 and retrieved by the control circuit 30, or received audio data such as in the form of streaming audio data from a mobile radio service. The sound processing circuit 54 may include any appropriate buffers, decoders, amplifiers and so forth.

The display 22 may be coupled to the control circuit 30 by a video processing circuit 60 that converts video data to a video signal used to drive the display 22. The video processing circuit 60 may include any appropriate buffers, decoders, video data processors and so forth. The video data may be generated by the control circuit 30, retrieved from a video file that is stored in the memory 46, derived from an incoming video data stream that is received by the radio circuit 54 or obtained by any other suitable method. Also, the video data may be generated by the camera assembly 12 (e.g., such as a preview video stream to provide a viewfinder function for the camera assembly 12).

The electronic device 10 may further include one or more I/O interface(s) 62. The I/O interface(s) 62 may be in the form of typical mobile telephone I/O interfaces and may include one or more electrical connectors. As is typical, the I/O interface(s) 62 may be used to couple the electronic device 10 to a battery charger to charge a battery of a power supply unit (PSU) 64 within the electronic device 10. In addition, or in the alternative, the I/O interface(s) 62 may serve to connect the electronic device 10 to a headset assembly (e.g., a personal handsfree (PHF) device) that has a wired interface with the electronic device 10. Further, the I/O interface(s) 62 may serve to connect the electronic device 10 to a personal computer or other device via a data cable for the exchange of data.

The electronic device 10 may receive operating power via the I/O interface(s) 62 when connected to a vehicle power adapter or an electricity outlet power adapter. The PSU 64 may supply power to operate the electronic device 10 in the absence of an external power source.

The electronic device 10 also may include a system clock 66 for clocking the various components of the electronic device 10, such as the control circuit 30 and the memory 46.

The electronic device 10 also may include a position data receiver 68, such as a global positioning system (GPS) receiver, Galileo satellite system receiver or the like. The position data receiver 68 may be involved in determining the location of the electronic device 10.

The electronic device 10 also may include a local wireless interface 70, such as an infrared transceiver and/or an RF interface (e.g., a Bluetooth interface), for establishing communication with an accessory, another mobile radio terminal, a computer or another device. For example, the local wireless interface 70 may operatively couple the electronic device 10 to a headset assembly (e.g., a PHF device) in an embodiment where the headset assembly has a corresponding wireless interface.

Figure 4:
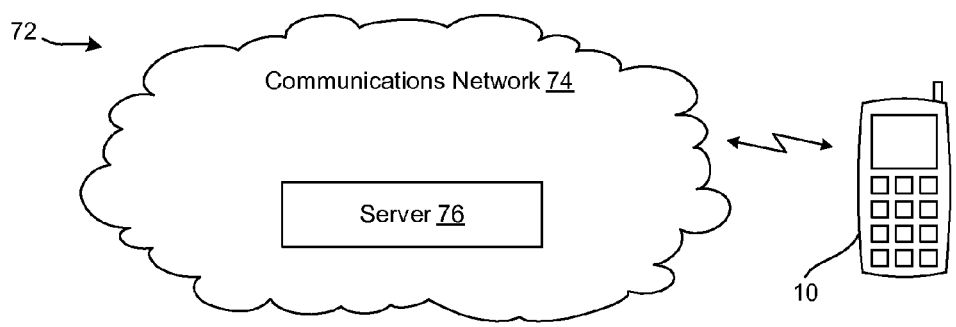
FIG. 4 is a schematic diagram of a communications system in which the electronic device of FIGS. 1 and 2 may operate.

With additional reference to FIG. 4, the electronic device 10 may be configured to operate as part of a communications system 72. The system 72 may include a communications network 74 having a server 76 (or servers) for managing calls placed by and destined to the electronic device 10, transmitting data to the electronic device 10 and carrying out any other support functions. The server 76 communicates with the electronic device 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 74 may support the communications activity of multiple electronic devices 10 and other types of end user devices. As will be appreciated, the server 76 may be configured as a typical computer system used to carry out server functions and may include a processor configured to execute software containing logical instructions that embody the functions of the server 76 and a memory to store such software.

Although certain embodiments have been shown and described, it is understood that equivalents and modifications falling within the scope of the appended claims will occur to others who are skilled in the art upon the reading and understanding of this specification.

What is claimed is:

1. A method of managing image data for a digital photograph, comprising:
   capturing image data corresponding to a scene with a camera assembly;
   segmenting the image data into a first portion and a second portion, wherein the first portion corresponds to a visual element in the scene that has a proximity relationship with a predetermined location within the photograph;
   processing the image data of the second portion to have a quality lower than the image data of the first portion; and
   storing an image file for the scene, the image file containing image data corresponding to the first and second portions so that the image file has a high quality portion and a low quality portion.

2. The method of claim 1, further comprising processing the image data corresponding to the first portion to reduce a quality of the image data corresponding to the first portion.

3. The method of claim 1, wherein processing the second portion of the image data is carried out by retaining a predetermined amount of the image data.

4. The method of claim 1, wherein processing the second portion of the image data is carried out by applying a compression algorithm.

5. The method of claim 1, further comprising processing image data adjacent the first portion of the image data such that the adjacent image data has a quality between the quality of the second portion of the image data and the quality of the first portion of the image data.

6. The method of claim 5, wherein the adjacent image data is processed to have a graduated quality from the quality of the second portion of the image data to the quality of the first portion of the image data.

7. The method of claim 1, wherein the visual element in the scene is identified using pattern recognition.

8. The method of claim 7, wherein the pattern recognition is used to identify a face of a person.

9. A camera assembly for taking a digital photograph, comprising:
   a sensor that captures image data corresponding to a scene;
   a controller that segments the image data into a first portion and a second portion, and that processes the image data of the second portion to have a quality lower than the image data of the first portion, wherein the first portion corresponds to a visual element in the scene that has a proximity relationship with a predetermined location within the photograph; and
   a memory that stores an image file for the scene, the image file containing image data corresponding to the first and second portions so that the image file has a high quality portion and a low quality portion.

10. The camera assembly of claim 9, wherein the controller processes the image data corresponding to the first portion to reduce a quality of the image data corresponding to the first portion.

11. The camera assembly of claim 9, wherein the second portion of the image data is processed by retaining a predetermined amount of the image data.

12. The camera assembly of claim 9, wherein the second portion of the image data is processed by applying a compression algorithm.

13. The camera assembly of claim 9, wherein the controller processes image data adjacent the first portion of the image data such that the adjacent image data has a quality between the quality of the second portion of the image data and the quality of the first portion of the image data.

14. The camera assembly of claim 13, wherein the adjacent image data is processed to have a graduated quality from the quality of the second portion of the image data to the quality of the first portion of the image data.

15. The camera assembly of claim 9, wherein the visual element in the scene is identified using pattern recognition.

16. The camera assembly of claim 15, wherein the pattern recognition is used to identify a face of a person.

17. The camera assembly of claim 9, wherein the camera assembly forms part of a mobile telephone that includes call circuitry to establish a call over a network.

* * * * *